Jan. 13, 1959 T. J. KEHOE 2,868,110
COFFEE MAKERS
Filed Nov. 8, 1954

THOMAS J. KEHOE
Inventor

Atty.

United States Patent Office 2,868,110
Patented Jan. 13, 1959

2,868,110

COFFEE MAKERS

Thomas J. Kehoe, Perrysburg, Ohio

Application November 8, 1954, Serial No. 467,573

11 Claims. (Cl. 99—299)

This invention relates to extraction of solvents from subdivided solids or small material fragments, more particularly when said solids are subjected to controlled heat.

This invention has utility when incorporated in a cooker or treater for developing beverage portions and in more specific form comprising nested elements assembled in a pair of containers adaptable for pumping coaction, soaking or cooking relation and selective drainage, say as in coffee making.

Referring to the drawings.

Figure 1:
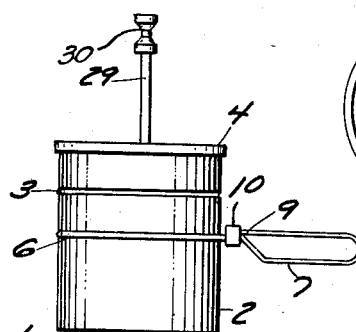
Fig. 1 is a side elevation of an embodiment of the invention in a coffee maker, such as for small family use, say for six or eight cups of coffee at a service.
Figure 2:
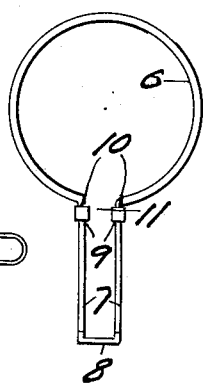
Fig. 2 is a plan view of a detachable all-temperature comfort handle for carrying and pouring from the vessel of Fig. 1.

The outer element is shown as a cylindrical metal can, say of spun or stamped aluminum, having a flat bottom 1 with vertical sides 2 rising therefrom to a plurality of capacity gaging or indicating rings 3 to a back turned outer flange 4 at open top 5.

Figure 3:
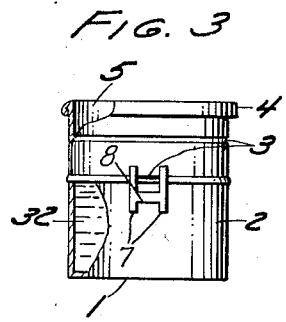
Fig. 3 is a side elevation of the outer chamber element of the unit, parts being broken away to show a charge volume thereinto, of say water which has been brought to a boil.
Figure 4:
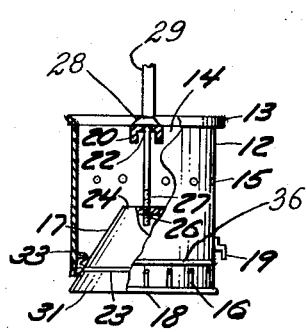
Fig. 4 is a fragmentary side elevational view of the inner or filter effecting chamber, for assembly with the element of Fig. 3.

A handle is provided in the form of a spring metal wire having an incomplete circular section 6 to a pair of radially extending arms 7 with weld connection 8 between the arms remote from the ring or circular section 6. The arm pair 7 have their upper end portions 9 anchored to the lower portion of said handles by spaced anchor means or strap wraps 10. As the annularly complete assembly for the handle is completed at the tie connection 8, there is spread or yield at spacing 11 between the arms 7. This provides an efficient readily attachable handle for the can (Fig. 3) adapted to be seated in any one of the plurality of grooves or rings 3. The handle portion 6 is disposed about the can portion 2 which distends the spacing 11 slightly, so that as the selected groove 3 is in register, then the portion 6 snaps thereinto and the grasped handle arms 7 provide firm holding. The scant body at the arms 7 and the relatively large air space in practice means that even though the can 2 may be full of boiling water, there is not an uncomfortable temperature at the arms 7 for grasping and holding the unit.

The major filter element is shown as comprising a cylindrical section 12 with a slight flare return bend top rim 13 as bounds for an opening 14. Spaced downward from the opening 14 is an annular series of ports 15. The section 12, remote from the opening 14, is open with a series of crimps 16, thereby serving a two-fold purpose: (1) spacing ribs to contact the conical wall 17 of a complementary member, and (2) yieldable or spring spacing regions 18 between the relatively more stiff ribs 16. A hook 19 on the wall of section 12 is sufficiently near said wall so that the section 12 may telescope or enter the can portion 2, and when it is shifted upwardly, said hook 19 may engage the rim or flange 4 to support the major portion of the filter element or section 12 above or outwardly from the major container 1 or can portion 2.

Diametrically of the opening 14 and adjacent thereto is a downwardly open channel 20 having its side flanges extend through ports in the wall 12 adjacent the flange 13. These channel extensions form tongues 21 which are weld anchored with the outside of the wall 12 thereby rigidly fixing the cross-bar or channel 20 with a port 22 axially of the wall 12.

Considering the wall 12 to be a springy light gage metal, say around 20 gage aluminum in thickness, there is for the conical wall 17, of a more rigid structure, say of 16 gauge aluminum, further reinforced by a shallow groove 23. With the vessel 1, 2, having a capacity of six or eight coffee cups, it may be 5¼" in diameter and the wall 17 be an upward pitch of say 60°. In this disclosure, this cone structure is truncated to a relatively minor diameter flat top 24 with a vent port 25. Concentrically of the cone 17, there is an internally threaded opening 26 in the top 24 adapted to be engaged by externally threaded portion 27 of a stem having a collar 28 adapted to abut against the web of the flange crossbar or channel 20. Extension or stem 29, upward from the collar 28, may have a rotation or turning grip or handle portion 30. By this rotation, as the threading 27 engages the threading 26, the down-flaring cone 17 is drawn upward and concentrically of the wall 12 to have the cone wider lower end 31 move toward the lower tips of the ribs 16. As this contact is effected, further screwing pressure is transmitted to effect slight spreading of the lower end of the wall 12 for the yielding action to bring the inter-rib portions 18 into more close register with the taper wall 17, thereby adjusting the effective port area.

With a selected volume of water 32 brought to boiling temperature, a charge of ground coffee 33 is dropped through the opening 14 to fall in the outwardly narrowing region about the cone 17.

Figure 5:
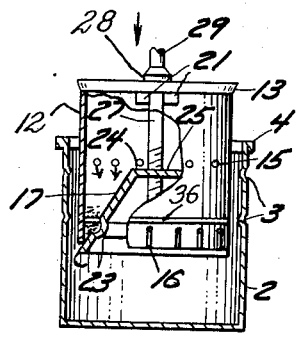
Fig. 5 is a vertical section of the chamber of Fig. 3 with a partly broken away showing of the filter of Fig. 4, at a pumping stage of assembly.
Figure 6:
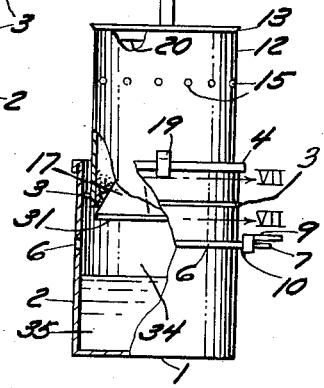
Fig. 6 is a showing of filter draining assembly of the pair of nesting elements, parts being broken away.
Figures 7, 8:
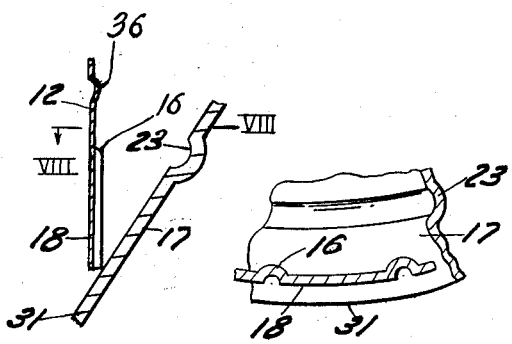
Fig. 7 is an enlarged section on the line VII—VII of Fig. 6 showing details of the filter flow adjustment.
Fig. 8 is a view from the line VIII—VIII of Fig. 7.

It is then in order for the one desiring to prepare the beverage, to exert a downward pump or thrust action (Fig. 5) to have the open bottom of the cone 17 descend in the vessel 1, 2, toward the bottom 1. This causes the water 32 to rise in the clearance between the walls 12, 2. It is in order to control this descent so that the water does not overflow the flange 4 but does rise to submerge the ports 15. Simultaneous with the inflow of the water, now warmed, say to about 200° F., to shower on the upper face of the cone 17 at the same time there is water film rise at the regions 18, thus to insure non-clogging of the filter. At the completion of the downthrust pumping stroke, the water seeks its level in the inner region as bounded by the wall 12, as well as outward thereof. The port 25 is of such small flow capacity, say ⅛", that it may take a time interval for the stable condition to develop. This interval of relatively slow flow, as well as a soaking period, of say two minutes, has extraction action on the ground coffee for the solubles to get into solution. At such time it is in order that the handle 30 be grasped and the filter section of the container be lifted partially so that the hook 19 may engage the rim 4 and thus support the inner section for film flow streams 34 to run from the filter into coffee body 35 in the vessel 1, 2. Should such infusion time or the character of the coffee subdivision not develop the desired beverage condition as to strength, a repumping may be had for a similar, longer, or shorter interval of soaking or infusion rest. As the condition be developed to suit the taste requirements desired, the filter section may be placed at rest, even with the bottom down, and no resulting stain therefrom, for the narrow slot openings at the regions 18, as outward for air drying and temperature drop, serve as being self-sealing. The handle 7 is used for dispensing the cup portions as responding to the ones to consume such. In the event the same coffee charge is to be used, re-insertion in the vessel 1, 2, unseals the ports 18.

The openwork grip portion pair 7 of the handle in their radial extent from the ring portion 6, and thus clear of the receptacle 1, 2, tends to dissipate any temperature departure away from atmospheric. Accordingly it follows, the handlegrip portions contribute to comfort condition whether the contents of the receptacle be cold or hot.

The ribs or crimps 16 divide the bounds for the infusor or filter into an endless annular series of slots as the normal sole coffee drip region over which the coffee grains tend to gather or congest as directed by the upwardly diverging walls of the taper 17 and member 12.

While the tubular member 12 is preferably of light gauge, it is responsive to adjustment relatively to the more rigid cone 17. In order that the member 12 does not tend to have its face regions come into flat or parallel sealing relation with the cone 17, there is in addition to the crimps or ribs 16, and slightly upward therefrom a shallow groove 36 of sufficient strength to have the body of the tubular member 12 normally hold to true cylindrical condition in the region of the cone 17.

The converging walls of the cylindrical nesting section 12 and the cone 17 direct the coffee as settling to have a sort of key stone build up in bridging the slots of approximate continuity in the endless series at the downwardly converging apex region. The slots are sufficiently narrow to preclude coffee particles from passing. The straining action of a circular port has its effective flow materially reduced by the skin friction ring. This skin friction flow restriction for the flow is approximately half that of ring ports, thereby at coffee-holding fineness in narrowness still very materially increasing liquid flow with coffee-dripping action of the infusion thereby speeded up. As before pointed out, the pump-action for re-cycling effectively maintains the slots against clogging, thereby maintaining volume treatment efficiency.

What is claimed and it is desired to secure by Letters Patent is:

1. In a coffee maker having a liquid retaining chamber and a diffuser chamber for the coffee particles to be extracted by the liquid, the improvement comprising: a movable imperforate bottom on said diffuser chamber providing a variable slit means around its periphery between said periphery and the bottom edge of said chamber to prevent passage of coffee particles therethrough but to permit the flow of the liquid between said chambers, the adjacent edges of the bottom of said diffuser chamber and the sides of said diffuser chamber being formed at an acute angle with respect to each other and with said slit means at the apex of said angle, at least one of said edges being flexible, spacer means bridging said slit means to form a plurality of peripheral variable slots of said slit between said edges, and means in said diffuser chamber for movably supporting said bottom for varying said slots.

2. A coffee maker comprising: an outer liquid carrying chamber having an upper open end, an inner diffuser chamber having a peripheral lower edge and telescoping into the upper open end of said outer chamber, said diffuser chamber having a separable bottom with a peripheral edge, and means for adjusting said peripheral edge of said bottom with respect to said peripheral lower edge of said diffuser chamber to form a variable slot between said edges through which the extracted liquid may pass but the coffee grounds to be extracted cannot pass, one of said edges of said slot being provided with a series of regularly spaced projections to form an endless series of port forming slots between said edge, and one of said edges of said slots being formed of a flexible material deformable between said projections to vary the width of said slots.

3. A coffee maker according to claim 2 wherein said diffuser chamber acts as a plunger piston pump for the liquid in said liquid carrying chamber to force said liquid between said chambers and into the upper end portion of said diffuser chamber.

4. A coffee maker according to claim 3 wherein said diffuser chamber is provided with a plurality of spray directing ports in the upper portion thereof, whereby the liquid forced around said chamber sprays over the grounds in the lower portion of said diffuser chamber.

5. A coffee maker according to claim 2 including means inside said diffuser chamber for supporting said slot adjusting means.

6. A filtering device comprising a liquid chamber and a diffuser chamber, said diffuser chamber having at least two co-operating walls spaced along one of their adjacent edges to form a slit between said edges of said walls, means to move said edges relative to each other to vary the width of said slit, and means extending between said edges to prevent the complete closure of said slit, at least one of said edges being made of a resiliently deformable material to vary the width of said slit between said means for preventing its complete closure.

7. A filtering device according to claim 6 wherein said walls adjacent said edges are inclined toward each other to form an acute angle whose apex is at said slit.

8. A coffee maker comprising an outer liquid chamber having an open upper end, an inner diffuser chamber having an opening at its upper end and telescoping into the upper open end of said outer liquid chamber, said inner diffuser chamber having side walls and a bottom detached at its periphery from said side walls, said periphery of said bottom having an edge wall inclined toward the lower edge of said side walls and said lower edge of said side walls being flexible and having inwardly extending projections to define said slots between the adjacent edges of said side walls and said periphery of said bottom, means for supporting said bottom from inside said diffuser chamber, said supporting means including means for adjusting the relative position between said bottom and said side walls to vary the width of said slots.

9. A coffee maker according to claim 8 wherein said adjacent edges of said side walls and the periphery of said bottom converge to form concentric converging walls toward said slot.

10. A coffee maker according to claim 8 wherein said means for adjusting the relative position between said bottom and said side walls comprises a screw thread means journalled in said supporting means and threaded into said bottom.

11. A coffee maker according to claim 10 wherein said screw thread means includes an extension and rotatable handle extending above said opening in the top of said diffuser chamber by which said diffuser chamber may be lifted for telescoping into and out of said liquid chamber as well as for adjusting by rotation thereof the width of said slot.

(References on following page)

References Cited in the file of this patent

UNITED STATES PATENTS

| | | | |
|---|---|---|---|
| 676,763 | Nelson | June 18, | 1901 |
| 745,744 | Uhalt | Dec. 1, | 1903 |
| 797,478 | Wells | Aug. 15, | 1905 |
| 1,008,861 | Piaseczny | Nov. 14, | 1911 |
| 1,362,616 | Galt | Dec. 21, | 1920 |
| 1,496,600 | Rau | June 3, | 1924 |
| 1,699,303 | Mennicke et al. | Jan. 15, | 1929 |
| 2,211,486 | Zoia | Aug. 13, | 1940 |
| 2,240,721 | Selitzky | May 6, | 1941 |
| 2,319,511 | Nesham | May 18, | 1943 |
| 2,560,214 | Cameron | July 10, | 1951 |
| 2,562,433 | Moore | July 31, | 1951 |
| 2,745,333 | Campbell | May 15, | 1956 |

FOREIGN PATENTS

| | | | |
|---|---|---|---|
| 209,893 | Great Britain | Jan. 24, | 1924 |